(No Model.)  3 Sheets—Sheet 1.

E. C. & A. U. SMITH.
AUTOMATIC COMPUTING SCALE.

No. 586,876.  Patented July 20, 1897.

WITNESSES  
H. A. Lamb.  
Susan V. Heley.

INVENTORS  
Edmond C. Smith and  
Albert U. Smith  
By H. M. Wooster  
Atty.

(No Model.) 3 Sheets—Sheet 2.

E. C. & A. U. SMITH.
AUTOMATIC COMPUTING SCALE.

No. 586,876. Patented July 20, 1897.

WITNESSES
H. A. Lamb
Susan V. Heley

INVENTORS
Edmond C. Smith and
Albert U. Smith
By A. M. Wooster
Atty.

(No Model.)  
3 Sheets—Sheet 3.

E. C. & A. U. SMITH.
AUTOMATIC COMPUTING SCALE.

No. 586,876.  
Patented July 20, 1897.

WITNESSES  
H. A. Lamb  
Susan V. Holey

INVENTORS  
Edmond C. Smith and  
Albert U. Smith  
By A. M. Wooster, Atty.

UNITED STATES PATENT OFFICE.

EDMOND C. SMITH AND ALBERT U. SMITH, OF SAUGATUCK, CONNECTICUT.

AUTOMATIC COMPUTING-SCALE.

SPECIFICATION forming part of Letters Patent No. 586,876, dated July 20, 1897.

Application filed January 28, 1897. Serial No. 621,020. (No model.)

*To all whom it may concern:*

Be it known that we, EDMOND C. SMITH and ALBERT U. SMITH, citizens of the United States, residing at Saugatuck, in the county of Fairfield and State of Connecticut, have invented certain new and useful Improvements in Automatic Computing-Scales; and we do hereby declare the following to be a full, clear, and exact description of the invention, such as will enable others skilled in the art to which it appertains to make and use the same.

This invention relates to improvements in that type of scales which automatically compute and indicate the amount to be charged for, as well as the weight of, the merchandise placed in the weighing-pan, such as shown in reissued Letters Patent No. 11,536, dated April 28, 1896. In such scales the figures shown on the drum are necessarily quite small, and some difficulty is experienced by purchasers in reading these figures to know the weight which they are receiving. Many purchasers do not care to step close to the scales to read the price-figures, and yet they wish to know the weight without close inspection of the drum.

The object of this present invention, therefore, is to combine with the scales of the type mentioned means whereby a purchaser may ascertain the weight of the goods from the usual distance and in the manner to which he has been accustomed.

To these ends the present invention consists in the construction and combination of parts substantially as hereinafter described and claimed.

Figure 1:
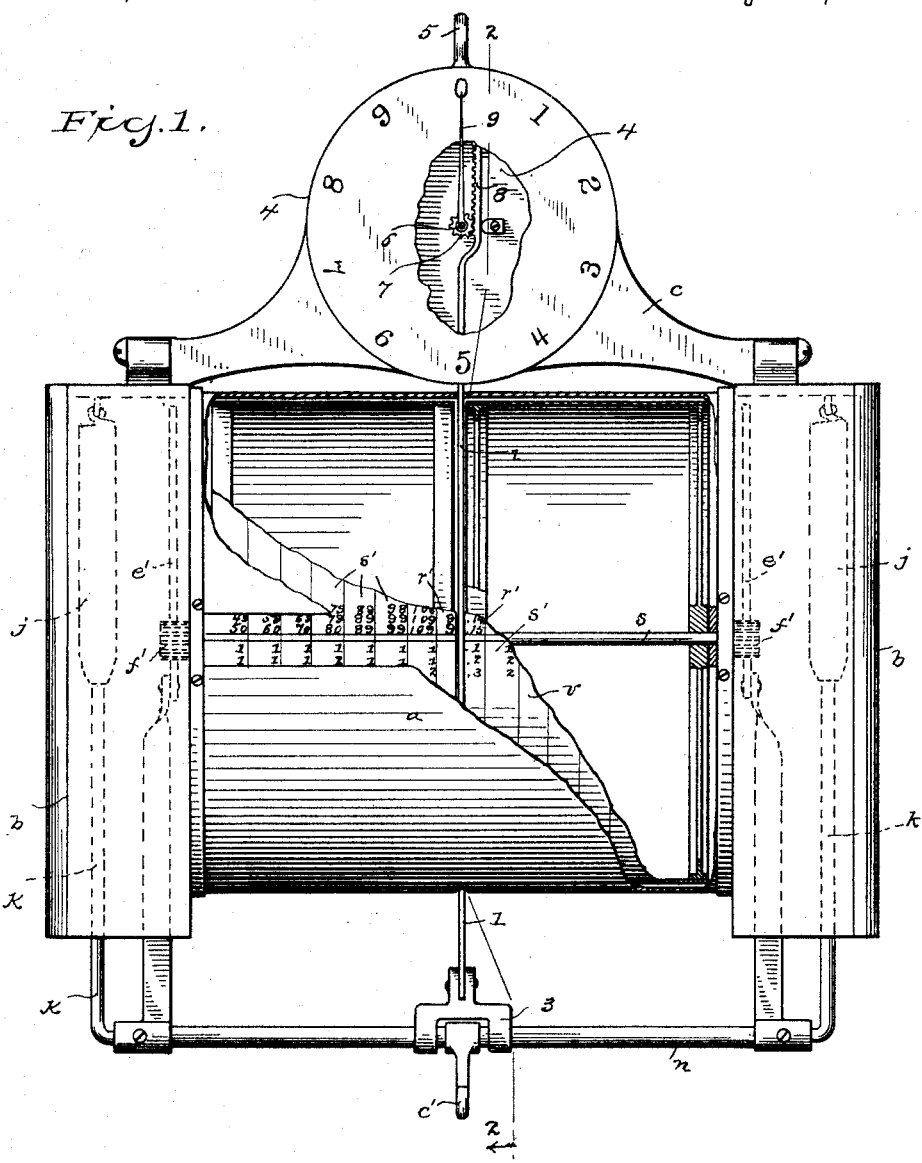
Figure 2:
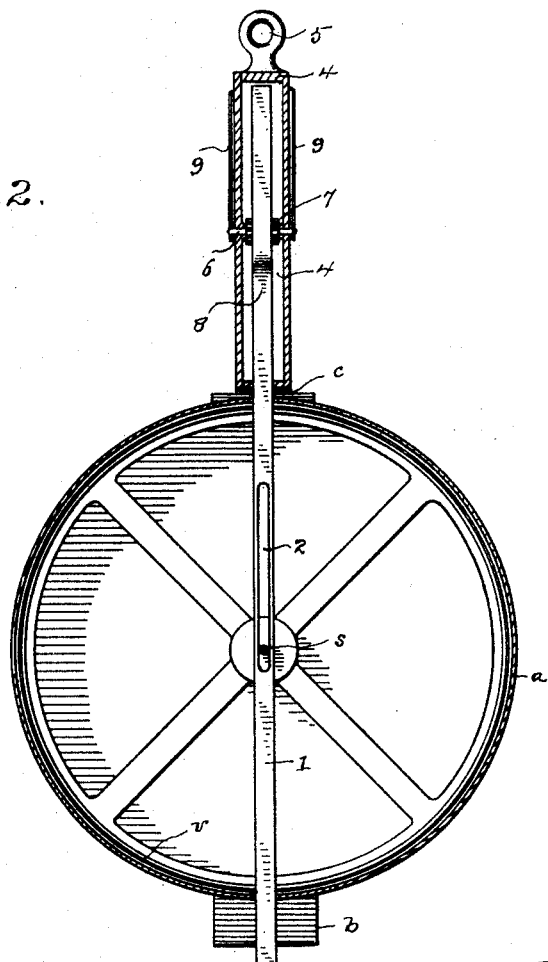
Figure 3:
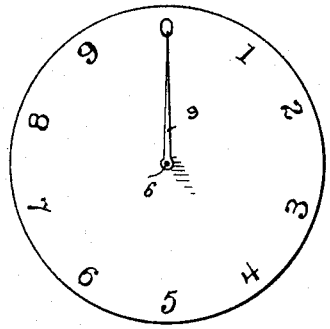
Figure 4:
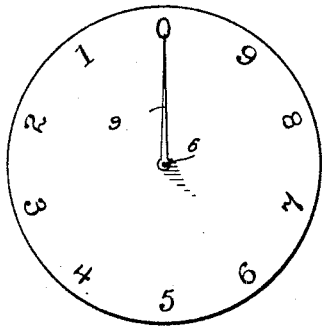
Figure 5:
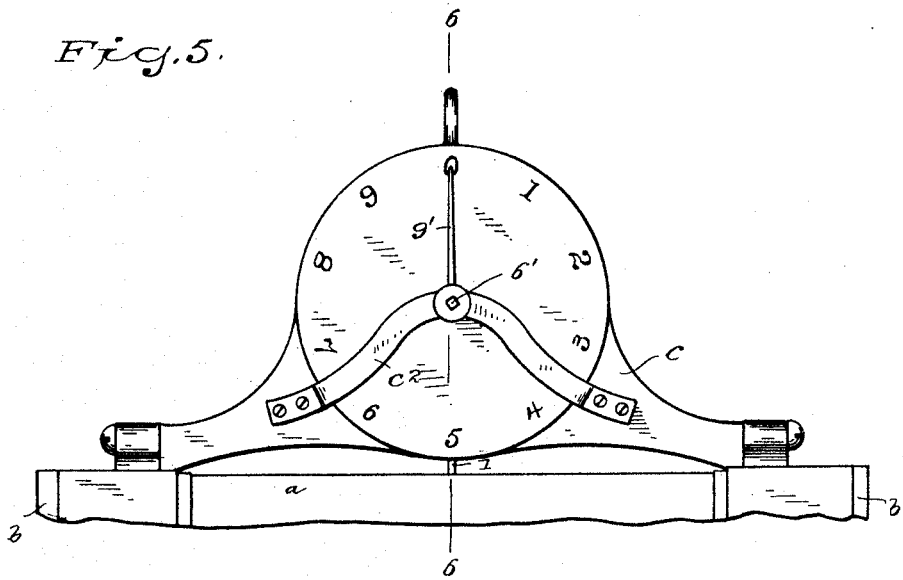
Figure 6:
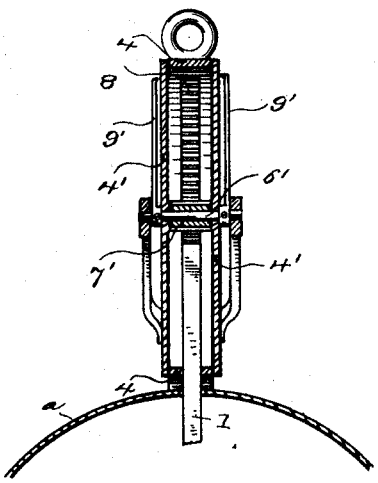
Figure 7:
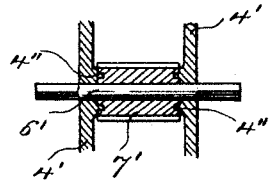

In the accompanying drawings, Figure 1 represents a front elevation of so much of our improved device as is necessary to illustrate the present invention, portions of the drum and casing being broken away. Fig. 2 represents a section on line $z\ z$ of Fig. 1. Figs. 3 and 4 represent, respectively, detail views of the front and rear dials. Fig. 5 represents a detail elevation of a modification in which the pointers are stationary and the dials revolve. Fig. 6 represents a section on line 6 6 of Fig. 5, and Fig. 7 represents an enlarged detail view of the spindle and pinion.

Similar reference-characters indicate the same or similar parts in all the views.

Referring first to Figs. 1 to 4, inclusive, and to the parts which are either identical with or similar to those shown in the patent above mentioned and having the same reference-characters, it has seemed sufficient to indicate some of said parts by dotted lines.

$a$ is the casing; $b$, the uprights, which contain the springs and racks; $c$, the upper cross-bar; $j$, the balance-springs; $k$, the draft-rods; $n$, the yoke; $s$, the drum-shaft, having pinions $f'$; $v$, the indicator-drum; $c'$, the hook for the scale-pan, and $e'$ the rack-bars, which engage the pinions $f'$ and are connected with the yoke $n$. The operation of these parts is the same as in the patent mentioned and need not be described herein further than to state that the drum is rotated more or less according to the weight applied to the hook $c'$.

In the present invention the drum is composed of two sections separated by a narrow space to permit a rod 1 to pass diametrically across and through the casing, said rod having an elongated slot 2, through which the shaft $s$ passes. The lower end of the rod 1 is connected to an ear 3, attached to the yoke-bar $n$, so as to be moved vertically with said bar in weighing.

The cross-bar $c$ in this invention is formed at the center into a circular casing or chamber 4, having a suspending-eye 5 at the top and having its front and rear surfaces supplied with numerals similar to those on the ordinary dial-scales. A spindle 6 is mounted at the center of the casing 4 (see Figs. 1 to 4, inclusive) and is provided with a pinion 7, which meshes with a rack 8, attached to or forming the upper end of the rod 1.

Each end of the spindle 6 projects through the wall of the casing and carries a pointer or index 9, adapted to indicate the weight of the article to be sold, said pointer moving about the dial in the ordinary manner. Since both pointers are attached to a single spindle, the numerals on one dial are arranged successively, as shown in Fig. 3, while the numerals on the other dial are arranged in the reverse order, as shown in Fig. 4.

In the use of this weighing apparatus the merchandise is placed in the pan (not shown) attached to the hook $c'$, the device being suspended by means of the eye 5. As the pan descends to the distance permitted by the springs $j$ the rack-bars $e'$ cause the drum $v$ to rotate and indicate to the salesman the weight and price of the goods, as described in the aforesaid patent. At the same time the rod 1 is pulled down and rotates the pointers 9 by means of the rack 8 and pinion 7 and indicates the weight of the goods in a manner that is plainly perceptible to the purchaser within any ordinary distance and whether he be on one side or the other of the scale.

As shown in Fig. 1, the indications around the periphery of the two-part drum are substantially the same as in the reissued Letters Patent No. 11,536, above referred to. In said Fig. 1 the scale $r'$, which indicates pounds and ounces, is located at the center of the drum, the column for the pounds being on one side of the narrow space between the two sections of the drum and the column for the ounces being on the other side of the said space.

$s'$ are columns of figures parallel with the scale $r'$ and arranged in alinement therewith, which indicate the total amount in money for which a commodity should be sold after it has been weighed. Therefore the merchant (and the customer also, if he wishes) may determine both the weight and the price by looking at the figures on the drum; but if the customer is near-sighted, or if for any other reason he cannot read the figures on the drum, he can determine the weight by looking at the dial in the manner to which he has been accustomed.

We have therefore combined in one apparatus all of the advantages of two forms of weighing devices without duplicating the balancing mechanism, since the balance-springs $j$ serve to operate both indicators—the drum and the pointers—and require no change in their form, construction, or adaptation beyond increasing their tension to compensate for the added weight of the bar 1.

In Figs. 5, 6, and 7 we illustrate a construction in which the dials revolve instead of the pointers. Brackets $c^2$, attached to the cross-bar $c$, are connected at their centers by a spindle $6'$, which is secured so as not to rotate, and to this spindle the pointers $9'$ are secured, as by screws, so as to remain in fixed positions. A pinion $7'$ is mounted to rotate on the spindle, and the two dials $4'$ are also mounted to rotate on said spindle and are connected with the pinion so as to rotate therewith, as by means of suitable pins $4''$. (See Fig. 7.) The edges of the dials $4'$ are separate from the circular wall or casing 4 in order that they may be freely rotated with the pinion $7'$ by means of the rack 8, and said dials are provided with reverse sets of numerals, as in Figs. 3 and 4. With this form of indicator the purchaser is not obliged to follow the movements of a rotating pointer, but may simply note the dial-figures which stop opposite the pointer.

Having now described our invention, we claim—

The combination with the casing $a$ and uprights $b$, of the two-part drum $v$ in said casing and having its periphery arranged to indicate both weight and price, the shaft $s$ for said drum having a pinion $f'$ at each end, the yoke-bar $n$, the racks $e'$ and balance-springs $j$ in the uprights $b$ and connected with the bar $n$ the rod 1 having a slot for the shaft $s$ and extending through the casing between the two parts of the drum and connected with the bar $n$, the casing 4 having dials, the spindle 6 having pointers 9 and pinion 7, and the rack 8 at the upper end of rod 1 and engaging the pinion 7, substantially as and for the purpose described.

In testimony whereof we affix our signatures in presence of two witnesses.

EDMOND C. SMITH.
    ALBERT U. SMITH.

Witnesses:
 RUFUS WAKEMAN,
 ORLANDO I. ALLEN.